(12) United States Patent
Takahashi (10) Patent No.: US 7,656,869 B2
(45) Date of Patent: Feb. 2, 2010

(54) DATA OUTPUT CONTROL APPARATUS

(75) Inventor: Satoshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 740 days.

(21) Appl. No.: 10/901,107

(22) Filed: Jul. 29, 2004

(65) Prior Publication Data

US 2006/0013213 A1    Jan. 19, 2006

(30) Foreign Application Priority Data

Jul. 31, 2003   (JP) ............... 2003-284485

(51) Int. Cl.
*H04L 12/28*   (2006.01)
*H04L 12/56*   (2006.01)

(52) U.S. Cl. ............... 370/389; 370/229; 370/345; 370/394; 370/504; 375/240.01; 386/68; 386/96; 386/111; 386/125

(58) Field of Classification Search ............... 370/229, 370/259, 351, 464, 504, 345, 394; 375/240.01, 375/240, 240.12, 240.16; 386/68, 96, 111, 386/125
See application file for complete search history.

(56) References Cited

U.S. PATENT DOCUMENTS

| 4,490,817 | A  | * | 12/1984 | Turner ............... 370/244 |
| 6,052,507 | A  | * | 4/2000  | Niida et al. ............... 386/68 |
| 6,185,228 | B1 |   | 2/2001  | Takashimizu et al. |
| 6,493,362 | B1 | * | 12/2002 | Inazumi ............... 370/537 |
| 6,529,550 | B2 | * | 3/2003  | Tahara et al. ............... 375/240 |
| 6,597,860 | B2 | * | 7/2003  | Song et al. ............... 386/68 |
| 6,850,252 | B1 | * | 2/2005  | Hoffberg ............... 715/716 |
| 7,031,348 | B1 | * | 4/2006  | Gazit ............... 370/504 |
| 2002/0003942 | A1 |   | 1/2002  | Yamauchi et al. |
| 2002/0064188 | A1 | * | 5/2002  | Mizobata ............... 370/535 |
| 2002/0145702 | A1 | * | 10/2002 | Kato et al. ............... 352/1 |
| 2002/0196853 | A1 | * | 12/2002 | Liang et al. ............... 375/240.16 |
| 2003/0035486 | A1 | * | 2/2003  | Kato et al. ............... 375/240.26 |
| 2003/0079117 | A1 | * | 4/2003  | Wise et al. ............... 712/300 |
| 2003/0086688 | A1 | * | 5/2003  | Saeki et al. ............... 386/65 |
| 2003/0103766 | A1 | * | 6/2003  | Sugahara et al. ............... 386/96 |
| 2003/0133452 | A1 | * | 7/2003  | Su ............... 370/392 |
| 2003/0175012 | A1 | * | 9/2003  | Okada et al. ............... 386/69 |
| 2004/0111452 | A1 | * | 6/2004  | Sakamoto et al. ............... 708/160 |

FOREIGN PATENT DOCUMENTS

| JP | 10-145755 | 5/1998 |
| JP | 11-239175 | 8/1999 |
| JP | 2003-9082 | 1/2003 |

* cited by examiner

*Primary Examiner*—Pankaj Kumar
*Assistant Examiner*—Lonnie Sweet
(74) *Attorney, Agent, or Firm*—Wenderoth, Lind & Ponack, L.L.P.

(57) ABSTRACT

In a data output control apparatus, a data replacement unit performs replacement of information packets so as to reflect the contents of a partial TS after the transfer status thereof has changed, and outputs a replacement signal as information relating to the replaced packet data to a controller. Therefore, the controller for controlling the data replacement unit can continuously recognize the status of replacement of packet data, and becomes able to change the respective information tables according to the operation of the partial TS, thereby realizing dynamic change while maintaining the continuity of the respective tables in the partial TS.

6 Claims, 6 Drawing Sheets

DIT

| name of data | table id | section syntax indicator | reserved future use | reserved | section length | transition flag | reserved future use |
|---|---|---|---|---|---|---|---|
| number of bits | 8 | 1 | 1 | 2 | 12 | 1 | 7 |

Fig.7 Prior Art

DATA OUTPUT CONTROL APPARATUS

FIELD OF THE INVENTION

The present invention relates to a data output control apparatus for sorting data and, more particularly, to a data output control apparatus for sorting partial transport streams.

BACKGROUND OF THE INVENTION

Conventionally, transfer of streams based on MPEG has been carried out as follows. An input analog stream is digital-converted into a form of a partial transport stream (hereinafter referred to as a partial TS). Then, the MPEG partial TS is transferred directly (or after being digital-recorded in a DVHS tape or the like as required) through a digital interface. The partial TS is composed of packets of elementary streams (hereinafter referred to as ES packets) of video and audio analog streams, and packets of predetermined information tables (hereinafter referred to as information packets), and each packet is identified by a parameter such as "table id" that is present in a header of the packet.

Examples of typical data formats of information tables included in partial TS are as follows: a program association table (hereinafter referred to as PAT) and a program map table (hereinafter referred to as PMT) which are standardized by STD-B10 of Association of Radio Industries and Businesses (ARIB); and a discontinuity information table (hereinafter referred to as DIT) and a selection information table (hereinafter referred to as SIT) which are standardized by STD-B21 of ARIB.

FIGS. 4 to 7 illustrate the formats of the above-mentioned information table packets, i.e., PAT, PMT, DIT, and SIT, respectively.

As shown in FIGS. 4 to 7, the information packets contain various kinds of information indicating the contents of the partial TS to be transferred. When the transfer status of the partial TS changes, the information in the information packets are altered so as to reflect the contents of the partial TS being transferred (refer to Japanese Published Patent Application No. Hei. 10-145755 (Page 9, FIG. 1), and Japanese Published Patent Application No. 2003-92738 (Page 18, FIG. 1)).

In the conventional data output control apparatus, however, it is difficult to recognize the transfer status of the partial TS, when the transfer status of the partial TS changes and thereby the information packets are altered. Therefore, it is difficult to judge when alteration of the information packets has been carried out.

Further, in the conventional data output control apparatus, when the transfer status of the partial TS changes, alteration of the corresponding information packet is carried out based on comparison with a specific packet ID. Therefore, for example, when the number of packets of the respective information tables changes, the process of altering the information packets cannot satisfactorily follow the change in the number of packets.

SUMMARY OF THE INVENTION

The present invention is made to solve the above-described problems and has for its object to provide a data output control apparatus which facilitates dynamic alternation of an information table by clarifying a point in time when the information table is changed, and by altering an information packet on the basis of the result of comparison with a specific packet ID.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a data output control apparatus comprises a parameter storage unit in which parameters for identifying packets are stored; a parameter extractor for extracting parameters from inputted packet data; a comparator for comparing the parameters extracted by the parameter extractor with the parameters stored in the parameter storage unit to output a comparison result signal; a controller for updating the parameters stored in the parameter storage unit, and outputting a control signal to a data replacement unit to control the data replacement unit; the data replacement unit for performing replacement of the inputted packet data on the basis of the comparison result signal from the comparator and the control signal from the controller, and outputting a replacement signal which is information relating to the replaced packet data; and an output controller for receiving the inputted packet data and the replaced data outputted from the data replacement unit, and performing output control for packet data to be finally outputted, on the basis of the comparison result signal from the comparator. Therefore, the controller can continuously recognize the status of replacement of packet data on the basis of the replacement signal outputted from the data replacement unit, and change the respective information tables according to the operation of the partial TS, thereby realizing dynamic change while maintaining the continuity of the respective tables in the partial TS.

According to a second aspect of the present invention, in the data output control apparatus according to the first aspect, the data replacement unit includes a data output replacement unit for replacing the inputted packet data on the basis of the comparison result signal from the comparator and the control signal from the controller; and a counter for counting the number of packets which are replaced in the data output replacement unit and, when the number of packets reaches a predetermined value, outputting a replacement signal indicating that the number of packets reaches the predetermined value, to the controller. Therefore, the controller, which receives the replacement signal from the counter, can recognize the status of replacement of information packets in the data replacement unit, and control the data replacement unit while grasping the state of the data replacement unit.

According to a third aspect of the present invention, in the data output control apparatus according to the second aspect, the number of packets to be replaced is set as a predetermined value of the counter, and the counter outputs, to the controller, a replacement signal indicating that replacement of the packets to be replaced has been completed. Therefore, the controller, which receives the replacement signal from the counter, can recognize that replacement of the packets to be replaced has been completed, thereby preventing the controller from erroneously altering the data to be replaced before completion of replacement, which error makes the packet data itself invalid.

According to a fourth aspect of the present invention, in the data output control apparatus according to the first aspect, the data replacement unit includes a data replacement unit for replacing the inputted packet data on the basis of the comparison result signal from the comparator and the control signal from the controller, and outputting a replacement signal indicating that replacement of packet data has been done, every time the data replacement unit performs replacement of packet data. Therefore, the controller, which receives the replacement signal from the data replacement unit, can recognize that replacement of packet data has been done, thereby preventing the controller from altering the packet data at some midpoint in the packet to make the packet data invalid, or from stopping the packet data at some midpoint when the packet data is desired to be suddenly stopped.

According to a fifth aspect of the present invention, in the data output control apparatus according to the second aspect, the data replacement unit further includes a packet data holding unit for generating packet data to be replaced on the basis of the control signal from the controller, and holding the generated packet data; and the data output replacement unit replaces the inputted packet data with the packet data that is held by the packet data holding unit, on the basis of the comparison result signal from the comparator and the control signal from the controller. Therefore, the data replacement unit can smoothly carry out the process of replacing the packet data.

According to a sixth aspect of the present invention, in the data output control apparatus according to the first aspect, the output controller includes a discard packet generation unit for generating discard packets; and a selector for selecting packet data to be finally outputted, from among the inputted packet data, the replaced data outputted from the data replacement unit, and the discard packets generated by the discard packet generation unit, on the basis of the comparison result signal from the comparator. Therefore, the data output control apparatus can output TS packets according to the throughput of a receiver, without changing the total number of TS packets which are selected by the selector to be finally output.

DETAILED DESCRIPTION OF THE PREFERRED EMBODIMENTS

Embodiment 1

A first embodiment of the present invention will be described with reference to FIGS. 1 and 2. Hereinafter, a data output control apparatus according to the present invention will be described with consideration given to restrictions on a terrestrial digital broadcasting receiver.

Figure 1:
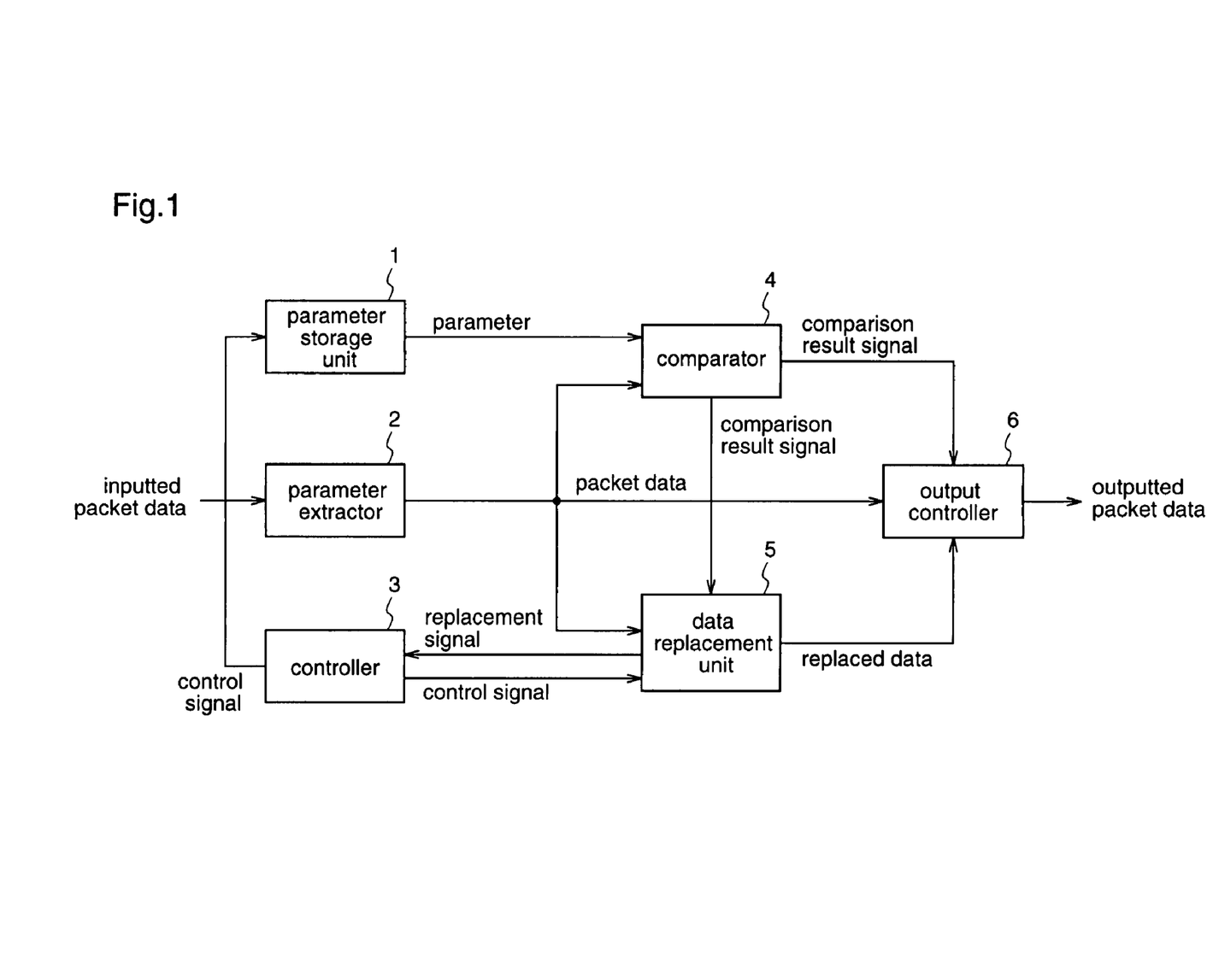
FIG. 1 is a block diagram illustrating the construction of a data output control apparatus according to a first embodiment of the present invention.

FIG. 1 is a block diagram illustrating the construction of a data output control apparatus according to the present invention.

In FIG. 1, the data output control apparatus of the present invention comprises a parameter storage unit 1, a parameter extractor 2, a controller 3, a comparator 4, a data replacement unit 5, and an output controller 6.

The parameter storage unit 1 stores parameters such as "table id" for identifying input packets.

The parameter extractor 2 extracts parameters such as "table id" from inputted packet data, and outputs the parameters to the comparator 4 and, simultaneously, outputs the inputted packet data to the data replacement unit 5 and the output controller 6.

The controller 3 updates the parameters stored in the parameter storage unit 1, and outputs a control signal to the data replacement unit 5 to alter information packets so that the transfer status of the partial TS that is finally output from the output controller 6 is reflected. The control signal is a signal for controlling the data replacement unit 5, and the control signal includes information such as the types of the information packets to be replaced, and the number of information packets to be replaced. Further, updation of the parameters stored in the parameter storage unit 1 by the controller 3 is the process of updating the parameters stored in the parameter storage unit 1 in accordance with broadcast data to be processed by the data output control apparatus because the parameters such as "table id" added to the packet data vary depending on the broadcast mode of the broadcast data to be processed by the data output control apparatus.

The comparator 4 compares the parameters stored in the parameter storage unit 1 with the parameters included in the packet data extracted from the parameter extractor 2, and outputs a comparison result signal as information indicating the contents of the inputted packet data.

The data replacement unit 5 replaces packet data as a predetermined information packet on the basis of the comparison result signal from the comparator 4 and the control signal from the controller 3 so that the transfer status of the partial TS that is finally output from the output controller 6 is reflected. Then, the data replacement unit 5 outputs the packet data (replaced data) as a replaced information packet to the output controller 6, and outputs a replacement signal as information relating to the replaced packet data (information packet) to the controller 3.

The output controller 6 receives the packet data outputted from the parameter extractor 2 and the replacement data outputted from the data replacement unit 5, and performs output control for the packet data to be finally output, on the basis of the comparison result signal supplied from the comparator 4.

Next, the operation of the data output control apparatus according to the first embodiment of the invention will be described. It is assumed that packet data is inputted in the MPEG partial transport stream format.

When the data output control apparatus according to the present invention receives the inputted packet data, the parameter extractor 2 extracts parameters such as "table id" and the like from the packet data, and outputs the parameters to the comparator 4, and simultaneously, outputs the inputted packet data to the data replacement unit 5 and the output controller 6.

The comparator 4 compares the parameters such as "table id" included in the packet data with the parameters stored in the parameter storage unit 1, and outputs a comparison result signal as information indicating the contents of the inputted packet data to the data replacement unit 5 and the output controller 6.

Further, in the data replacement unit 5, the comparison result signal from the comparator 4 and the control signal from the controller 3 are input to the data replacement unit 5, and the inputted predetermined information packets are replaced on the basis of the comparison result signal and the control signal so that the transfer status of the partial TS that is finally output from the output controller 6 is reflected, and the replaced data are output to the output controller 6. Further, a replacement signal indicating information relating to the replaced information packets is output from the data replacement unit 5 to the controller 3.

Thereby, the controller 3 receiving the replacement signal from the data replacement unit 5 is notified of the status of replacement of information packets in the data replacement unit 5, whereby control of the data replacement unit 5 can be carried out while grasping the status of the data replacement unit 5.

Further, the output controller 6 receives the packet data outputted from the parameter extractor 2 and the replaced data outputted from the data replacement unit 5, and packet data to be finally outputted is selected on the basis of the comparison result signal outputted from the comparator 4. Thereby, the output controller 6 is able to output a predetermined kind of ES packets that is selected according to the throughput of the receiver, and information packets which reflect the contents of the selected ES packets.

Next, the data replacement unit 5 of the data output control apparatus according to the present invention will be described in more detail. It is assumed that a control signal including information of an information packet to be a target of replacement, information of packet data to be replaced, and information of the number of packet data to be replaced, is output from the controller 3 to the data replacement unit 5.

Figure 2:
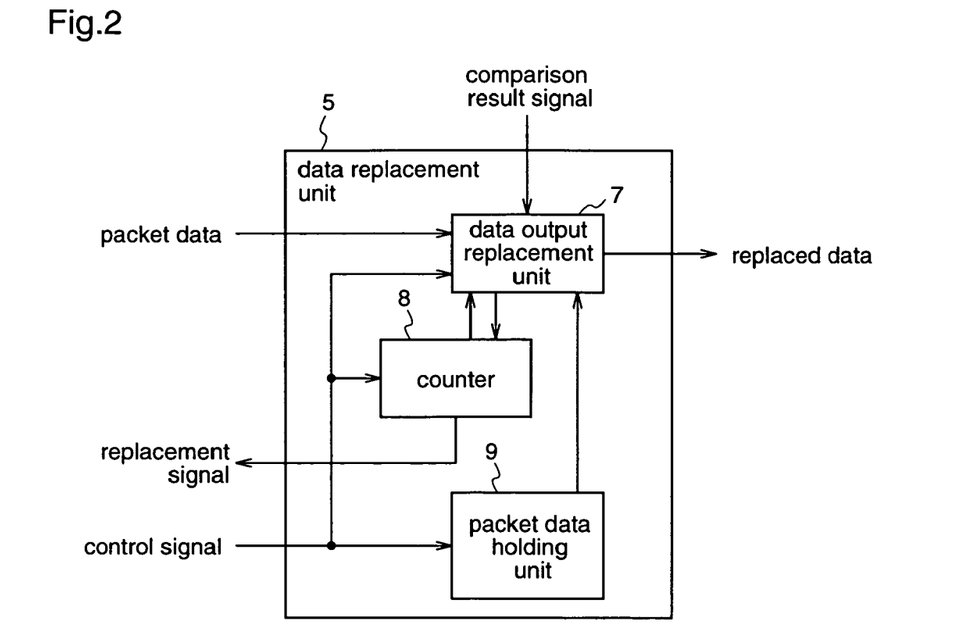
FIG. 2 is a block diagram illustrating the construction of a data replacement unit included in the data output control apparatus according to the first embodiment.

FIG. 2 is a block illustrating an example of the data replacement unit of the data output control apparatus according to the first embodiment.

In FIG. 2, the data replacement unit 5 comprises a data output replacement unit 7, a counter 8, and a packet data holder 9.

The data output replacement unit 7 detects an information packet to be a target of replacement, which is indicated by the control signal outputted from the controller 3, using the comparison result signal outputted from the comparator 4, and replaces the detected information packet with the packet data stored in the packet data holder 9, and then outputs the replaced packet data as replaced data to the output controller 6.

The counter 8 counts the number of packets which have been replaced by the data output replacement unit 7. When the number of packets reaches a predetermined value, the counter 8 outputs a replacement signal indicating that the number of packets has reached the predetermined value, to the controller 3. In this first embodiment, the number of packet data to be replaced, which is outputted from the controller 3, is set as the above-mentioned predetermined value, and the data replacement unit 5 outputs a replacement signal which indicates that the number of counts by the counter 8 has reached this value, to the controller 3. Thereby, the controller 3 can be notified that replacement of the predetermined number of packets has been completed.

The packet data holder 9 generates packet data to be replaced, on the basis of the information about the packet data to be replaced, which is indicated by the control signal from the controller 3, and holds the packet data. The information about the packet data to be replaced reflects the transfer status of the partial TS that is to be finally output from the output controller 6.

Next, the operation of the data replacement unit 5 will be concretely described.

When the comparison result signal from the comparator 4 and the control signal from the controller 3 are input to the data replacement unit 5, the data output replacement unit 7 detects the information packet as a target of replacement, which is indicated by the control signal, from the packet data outputted from the parameter extractor 2, on the basis of the comparison result signal.

On the other hand, in the packet data holder 9, information packets to be replaced are generated and held on the basis of the information of the packet data to be replaced, which is indicated by the control signal.

Then, in the data output replacement unit 7, when the information packet to be a target of replacement is detected, the detected information packet is replaced with the information packet held by the packet data holder 9, and the packet data after the replacement is output as replaced data to the output controller 6.

Further, a signal indicating that replacement of packet data is carried out is outputted every time replacement of packet data has been done, from the data output replacement unit 7 to the counter 8, and the number of replaced packet data is counted by the counter 8.

When the number of counts of the counter 8 reaches the number of packet data to be replaced, which is indicated by the control signal, the counter 8 generates a replacement signal indicating that replacement for the number of packets to be replaced has been completed, and outputs the replacement signal to the controller 3.

On receipt of the replacement signal from the data replacement unit 5, the controller 3 is notified that replacement for the number of packets to be replaced has been completed, thereby preventing the controller from erroneously altering the data to be replaced before completion of replacement, which error makes the packet data itself invalid.

In this first embodiment, the data replacement unit 5 is provided with the counter 8 for counting the number of packets that are replaced in the data output replacement unit 7. However, the data replacement unit 5 is not necessarily provided with the counter 8. The data output replacement unit 7 may output a replacement signal indicating that data replacement has been done, every time replacement of packet data is carried out. In this case, the controller 3 is notified, by the replacement signal, that replacement of packet data has been done, thereby preventing the controller from altering the packet data at some midpoint in the packet to make the packet data invalid, or from stopping the packet data at some midpoint when the packet data is desired to be suddenly stopped.

Figure 3:
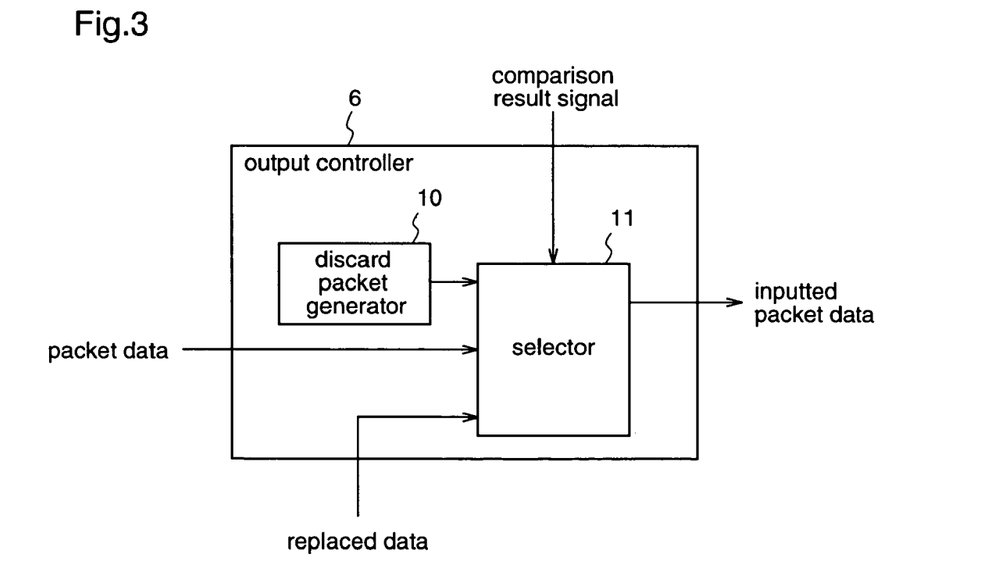
FIG. 3 is a block diagram illustrating the construction of an output control unit included in the data output control apparatus according to the first embodiment.
Figure 4:
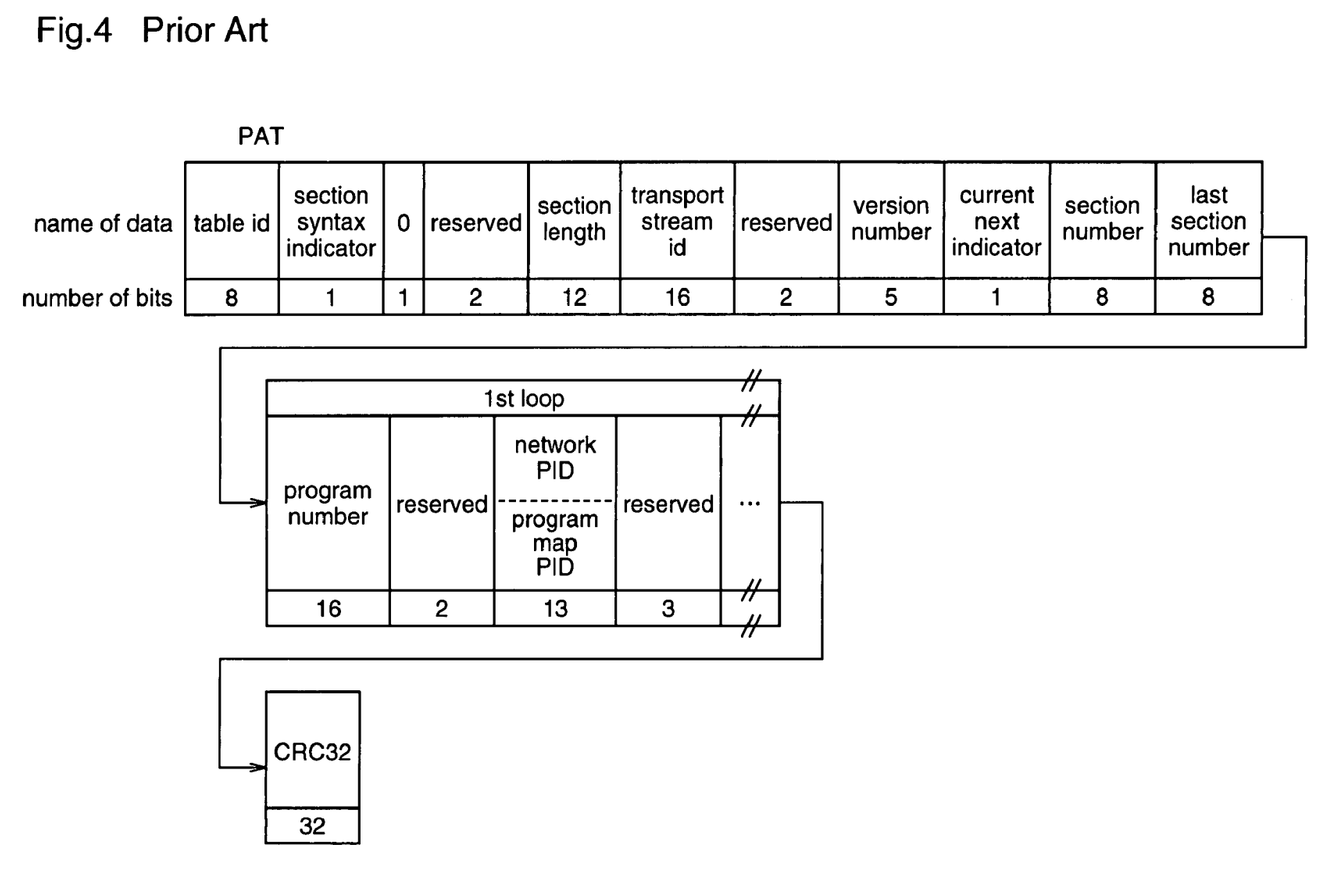
FIG. 4 is a diagram illustrating a format of PAT packet data.
Figure 5:
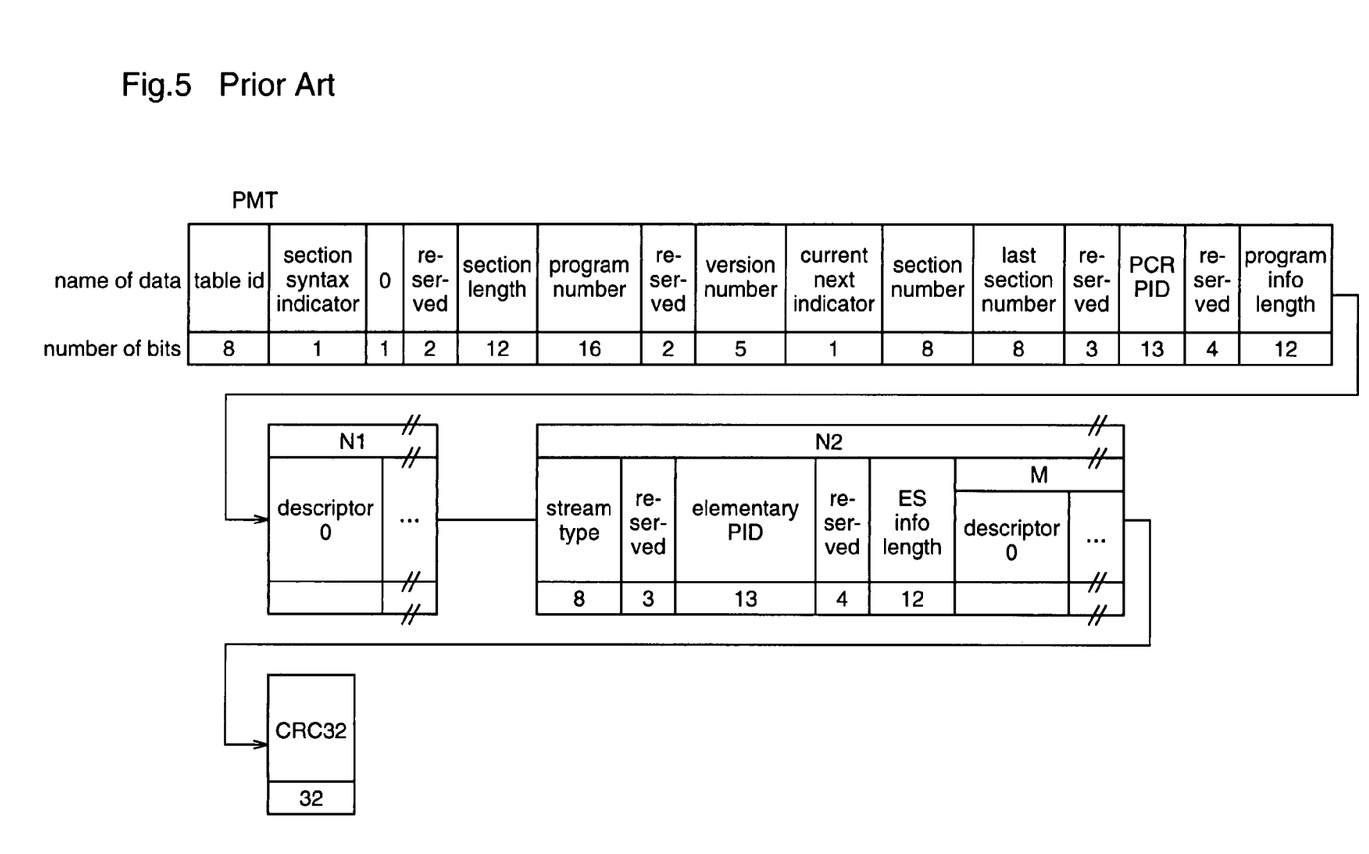
FIG. 5 is a diagram illustrating a format of PMT packet data.
Figure 6:
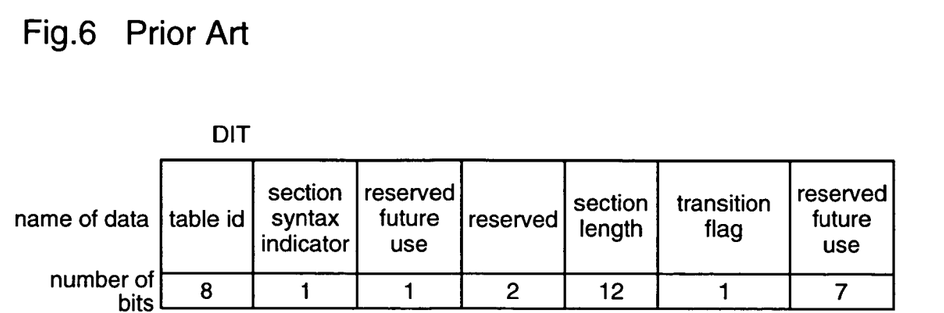
FIG. 6 is a diagram illustrating a format of DIT packet data.
Figure 7:
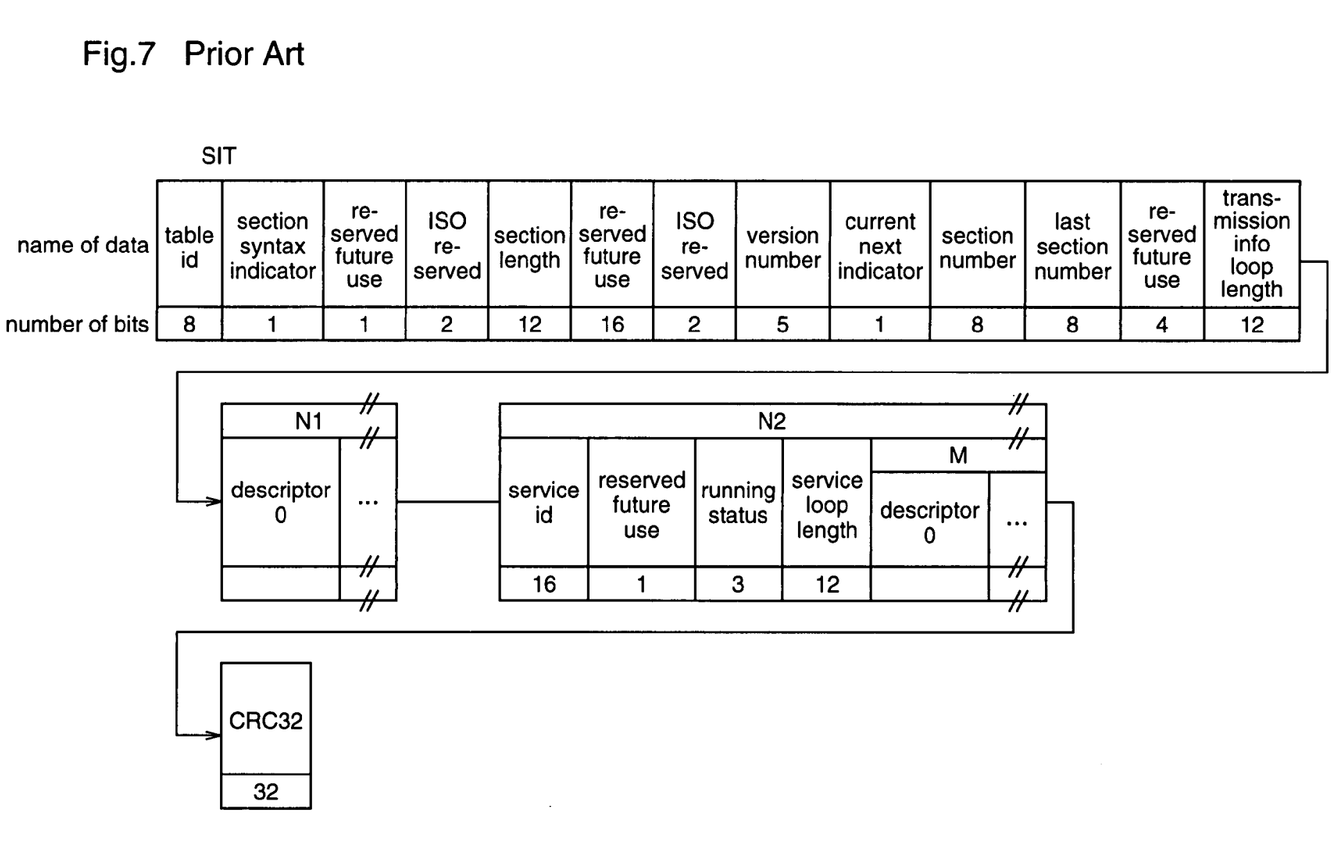
FIG. 7 is a diagram illustrating a format of SIT packet data.

Next, the output controller 6 of the data output control apparatus according to the present invention will be described in more detail.

FIG. 3 is a block diagram illustrating an example of an output controller of the data output control apparatus according to the first embodiment.

In FIG. 3, the output controller 6 comprises a discard packet generator 10, and a selector 11.

The discard packet generator 10 generates a discard packet that is a vacant packet to be inserted in place of unnecessary packet data.

The selector 11 receives the discard packet outputted from the discard packet generator 10, the packet data outputted from the parameter extractor 2, and the replaced data outputted from the data replacement unit 5, and selects packet data to be finally outputted on the basis of the comparison result signal supplied from the comparator 4, and outputs the selected data.

Next, the operation of the output controller 6 will be described.

In the output controller 6, a discard packet that is a vacant packet to be inserted in place of unnecessary packet data is generated by the discard packet generator 10, and the discard packet is output to the selector 11.

The packet data outputted from the parameter extractor 2, the replaced data outputted from the data replacement unit 5, and the discard packet outputted from the discard packet generator 10 are input to the selector 11 of the output controller 6. In the selector 11, it is determined, on the basis of the comparison result signal outputted from the comparator 4, which one of the following packets should be output as an information packet included in the inputted packet data, among the discard packet generated in the discard packet generation unit 10, the inputted information packet as it is, and the information packet as the replaced packet obtained in the data replacement unit 5. The selected packet is output to an external receiver.

Therefore, it is possible to output the TS packets according to the throughput of the receiver, without changing the total number of TS packets to be finally selected by and outputted from the selector 11.

Next, the data output control apparatus according to the present invention will be described with respect to the case where the number of information packets to be inputted varies. It is assumed that a processing unit for processing the packets outputted from the data output control apparatus has a throughput for three programs.

For example, assuming that the maximum number of programs to be entered in an information packet is five, when more than five programs are entered in the information packet, the information packet is divided into plural information packets having the same table-id to be transferred.

Assuming that the number of programs in an information packet to be input to the data output control apparatus is seven, the seven programs are divided over two information packets having the same table-id. In this case, since the processing unit for processing the output packets from the data output control apparatus of the present invention has a throughput for three programs, the data replacement unit 5 performs replacement of information packets so as to limit the number of programs from seven to three.

During replacement, since the number of processable programs is limited to three, two information packets having seven programs are brought together in one information packet. As for setting of the data replacement unit 5 of the data output control apparatus, when replacement of one information packet is completed, a replacement signal indicating that replacement of one packet is completed is output to the controller 3, and simultaneously, the one information packet which is replaced with the number of programs being limited to three is output as replaced data to the output controller 6. On receipt of the replacement signal from the data replacement unit 5, the controller 3 is notified of the status of replacement of information packets in the data replacement unit 5, whereby the controller 3 can control the data replacement unit 5 so as to replace the information packet that is inputted next and has the same table-id with a discard packet (a vacant packet). As a result, the number of information packets can easily be varied according to the throughput of the processing unit.

As described above, in the data output control apparatus according to the first embodiment of the present invention, the data replacement unit 5 replaces predetermined information packets on the basis of the comparison result signal from the comparator 4 and the control signal from the controller 3 so that the contents of the ES packet that is finally output from the output controller 6 is reflected, and outputs the replacement signal that indicates information relating to the replaced information packets to the controller 3. Therefore, the controller 3 can continuously recognize the status of replacement of packet data, and change the respective information tables according to the operation of the partial TS, thereby realizing dynamic change while maintaining the continuity of the respective information tables in the partial TS.

While in the data output control apparatus according to the first embodiment "table-id" is used as an example of a parameter for specifying a packet, PID or the like may be used as a parameter for specifying a packet.

In the data output control apparatus according to the first embodiment, when the transfer status of a partial TS changes and thereby an information packet should be changed, a point in time when an information table should be changed is clarified, thereby facilitating dynamic change in the information table.

What is claimed is:

1. A data output control apparatus comprising:
a parameter storage unit for storing parameters for identifying packets;
a parameter extractor for extracting parameters from inputted packet data;
a comparator for performing a comparison between the parameters extracted by the parameter extractor and the parameters stored in the parameter storage unit, and outputting a comparison result signal indicative of the comparison;
a controller for updating the parameters stored in the parameter storage unit, and outputting a control signal including information indicating a type of information packet to be replaced;
a data replacement unit for detecting a target information packet in the inputted packet data to be a target of replacement based on the information included in the control signal, and performing replacement of the target information packet in the inputted packet data with replaced packet data based on the comparison result signal from the comparator and the control signal from said controller for updating, outputting the replaced packet data, and outputting, to said controller for updating, a replacement signal which includes information relating to the replaced packet data, wherein said controller for updating performs the updating of the parameters stored in the parameter storage unit based on the replacement signal; and
an output controller for receiving the inputted packet data and the replaced packet data outputted from the data replacement unit, and performing output control for packet data to be finally outputted, based on the comparison result signal from the comparator,
wherein said controller for updating receives, from the data replacement unit, the replacement signal including the information relating to the replaced packet data, and obtains, from the received replacement signal, data replacement information of a status of the replacement performed by the data replacement unit, and
wherein said controller for updating controls the data replacement unit according to the obtained data replacement information of the status of the replacement performed by the data replacement unit.

2. The data output control apparatus as defined in claim 1 wherein
said data replacement unit includes:
a data output replacement unit for replacing the inputted packet data based on the comparison result signal from the comparator and the control signal from the controller for updating; and
a counter for counting the number of packets which are replaced in the data output replacement unit and, when the number of packets reaches a predetermined value, including, in the replacement signal outputted to the controller for updating, an indication that the number of packets has reached the predetermined value.

3. The data output control apparatus as defined in claim 2 wherein the number of packets to be replaced is set as a predetermined value of the counter, and the counter includes, in the replacement signal outputted to the controller for updating, an indication that replacement of the packets to be replaced has been completed.

4. The data output control apparatus as defined in claim 2 wherein said data replacement unit farther includes a packet data holding unit for generating packet data to be replaced on the basis of the control signal from the controller for updating, and holding the generated packet data; and said data output replacement unit replaces the inputted packet data with the packet data that is held by the packet data holding unit, on the basis of the comparison result signal from the comparator and the control signal from the controller for updating.

5. A data output control apparatus comprising:

a parameter storage unit for storing parameters for identifying packets;

a parameter extractor for extracting parameters from inputted packet data;

a comparator for performing a comparison between the parameters extracted by the parameter extractor and the parameters stored in the parameter storage unit, and outputting a comparison result signal indicative of the comparison;

a controller for updating the parameters stored in the parameter storage unit, and outputting a control signal;

a data replacement unit for performing replacement of the inputted packet data with replaced packet data based on the comparison result signal from the comparator and the control signal from said controller for updating, outputting the replaced packet data, and outputting, to said controller for updating, a replacement signal which includes information relating to the replaced packet data, wherein said controller for updating performs the updating of the parameters stored in the parameter storage unit based on the replacement signal; and an output controller for receiving the inputted packet data and the replaced packet data outputted from the data replacement unit, and performing output control for packet data to be finally outputted, based on the comparison result signal from the comparator, wherein said controller for updating receives, from the data replacement unit, the replacement signal including the information relating to the replaced packet data, and obtains, from the received replacement signal, data replacement information of a status of the replacement performed by the data replacement unit, wherein said controller for updating controls the data replacement unit according to the obtained data replacement information of the status of the replacement performed by the data replacement unit, and wherein said data replacement unit includes, in the replacement signal outputted to the controller for updating, an indication that replacement of packet data has been done, every time the data replacement unit performs replacement of packet data.

6. A data output control apparatus comprising:

a parameter storage unit for storing parameters for identifying packets;

a parameter extractor for extracting parameters from inputted packet data;

a comparator for performing a comparison between the parameters extracted by the parameter extractor and the parameters stored in the parameter storage unit, and outputting a comparison result signal indicative of the comparison;

a controller for updating the parameters stored in the parameter storage unit, and outputting a control signal;

a data replacement unit for performing replacement of the inputted packet data with replaced packet data based on the comparison result signal from the comparator and the control signal from said controller for updating, outputting the replaced packet data, and outputting, to said controller for updating, a replacement signal which includes information relating to the replaced packet data, wherein said controller for updating performs the updating of the parameters stored in the parameter storage unit based on the replacement signal; and an output controller for receiving the inputted packet data and the replaced packet data outputted from the data replacement unit, and performing output control for packet data to be finally outputted, based on the comparison result signal from the comparator, wherein said controller for updating receives, from the data replacement unit, the replacement signal including the information relating to the replaced packet data, and obtains, from the received replacement signal, data replacement information of a status of the replacement performed by the data replacement unit, wherein said controller for updating controls the data replacement unit according to the obtained data replacement information of the status of the replacement performed by the data replacement unit, and wherein said output controller includes:

a discard packet generation unit for generating discard packets; and a selector for selecting packet data to be finally outputted, from among the inputted packet data, the replaced data outputted from the data replacement unit, and the discard packets generated by the discard packet generation unit, on the basis of the comparison result signal from the comparator.

* * * * *

UNITED STATES PATENT AND TRADEMARK OFFICE
CERTIFICATE OF CORRECTION

| | |
|---|---|
| PATENT NO. | : 7,656,869 B2 |
| APPLICATION NO. | : 10/901107 |
| DATED | : February 2, 2010 |
| INVENTOR(S) | : Satoshi Takahashi |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this

Twenty-eighth Day of December, 2010

David J. Kappos
*Director of the United States Patent and Trademark Office*